(12) United States Patent
Favalli et al.

(10) Patent No.: US 12,703,217 B2
(45) Date of Patent: Aug. 11, 2026

(54) MOTOR VEHICLE WITH ACTIVE SUSPENSIONS AND CONTROL METHOD OF THE MOTOR VEHICLE

(71) Applicant: FERRARI S.P.A., Modena (IT)

(72) Inventors: Federico Favalli, Modena (IT); Andrea Fuso, Modena (IT); Francesca Mincigrucci, Modena (IT); Jacopo Canestri, Modena (IT)

(73) Assignee: FERRARI S.P.A. (IT)

( * ) Notice: Subject to any disclaimer, the term of this patent is extended or adjusted under 35 U.S.C. 154(b) by 0 days.

(21) Appl. No.: 19/184,846

(22) Filed: Apr. 21, 2025

(65) Prior Publication Data

US 2025/0326267 A1 Oct. 23, 2025

(30) Foreign Application Priority Data

Apr. 22, 2024 (IT) ........................ 102024000009121

(51) Int. Cl.
*B60G 17/016* (2006.01)

(52) U.S. Cl.
CPC .... *B60G 17/0164* (2013.01); *B60G 2400/204* (2013.01); *B60G 2500/30* (2013.01); *B60G 2600/182* (2013.01); *B60G 2800/18* (2013.01)

(58) Field of Classification Search
CPC .... B60G 17/0162; B60G 13/08; B60G 17/08; B60G 2202/24; B60G 2202/413; B60G 2400/0521; B60G 2400/0522; B60G 2400/0523; B60G 2400/053; B60G 2400/10; B60G 2400/204; B60G 2400/41; B60G 17/0164; B60G 2500/30; B60G 2600/182; B60G 2800/18
See application file for complete search history.

(56) References Cited

U.S. PATENT DOCUMENTS 10,752,075 B1 * 8/2020 Shukla .................. B60G 11/27
11,912,089 B1 2/2024 Golden et al.
(Continued)

FOREIGN PATENT DOCUMENTS

EP 4101665 A1 12/2022

OTHER PUBLICATIONS

Italian Search Report and Written Opinion, Italian Patent Application 2024000009121, Completion Date Oct. 22, 2024, 8 pp.

*Primary Examiner* — Toan C To
(74) *Attorney, Agent, or Firm* — The Belles Group, P.C.

(57) ABSTRACT

A motor vehicle comprises a suspended mass comprising a body, an unsprung mass comprising a plurality of wheels to allow the motor vehicle to move forward on a road, an active suspension assembly configured to suspend the suspended mass relative to the unsprung mass and controllable to move the suspended mass relative to the unsprung mass, an engine carried by the body, a transmission connecting the engine to at least two of said wheels, thereby defining traction wheels, such that the engine can deliver torque to the traction wheels causing acceleration of the motor vehicle, and a control unit configured to control the active suspension assembly during said acceleration and/or in a steady state of the motor vehicle prior to said acceleration imposing a displacement of the suspended mass relative to the unsprung mass according to a yaw axis of the motor vehicle to increase the maximum transmissible force from the traction wheels to the road.

19 Claims, 4 Drawing Sheets

(56) References Cited

U.S. PATENT DOCUMENTS

2004/0064246 A1* 4/2004 Lu ...................... B60R 21/0132 701/45
2007/0278752 A1* 12/2007 Schedgick ............ B60G 11/27 280/5.514
2008/0059021 A1* 3/2008 Lu ...................... B60G 17/0195 701/36
2008/0088107 A1* 4/2008 Bitter .................. B60G 21/073 280/124.161
2008/0210505 A1* 9/2008 Vigholm .............. E02F 9/2207 188/266.2
2008/0243334 A1* 10/2008 Bujak ................ B60G 17/0195 701/37
2008/0257626 A1* 10/2008 Carabelli ................. F03G 7/08 180/165
2014/0316637 A1* 10/2014 Rhode ................ B60G 17/0182 701/29.1
2015/0032332 A1* 1/2015 Kikuchi ............. B60W 30/025 701/37
2015/0081170 A1* 3/2015 Kikuchi ................ B60G 17/06 701/37
2016/0375948 A1* 12/2016 Takenaka ............ B60G 17/018 280/5.506
2018/0072189 A1* 3/2018 Plante ................... B62D 17/00
2020/0156430 A1* 5/2020 Oakden-Graus ....... B60G 17/06
2021/0260952 A1* 8/2021 Saylor ................ B60G 21/0555
2021/0394575 A1* 12/2021 Nong ................ B60G 17/0162

* cited by examiner 1
2
3
3b
3c
4
5
6
ECU
G
X
Y
Z 1
2
3
3b
3c
4
5
6
ECU
G
X
Y
Z 1
2
3
3b
3c
4
5
6
ECU
G
X
Y
Z

MOTOR VEHICLE WITH ACTIVE SUSPENSIONS AND CONTROL METHOD OF THE MOTOR VEHICLE

CROSS-REFERENCE TO RELATED APPLICATIONS

This patent application claims priority from Italian patent application no. 102024000009121 filed on 22 Apr. 2024, the entire disclosure of which is incorporated herein by reference.

TECHNICAL FIELD

The invention relates to a motor vehicle equipped with active suspensions, as well as a method for controlling the motor vehicle, for example during an acceleration phase.

PRIOR ART

As known, the body of a motor vehicle is normally suspended relative to the wheels via suspensions. Therefore, the body is part of what is typically referred to as the motor vehicle's suspended mass, while the wheels are part of what is typically referred to as the vehicle's unsprung mass.

The suspensions usually include a shock absorber, which in turn includes a spring and a damper.

The damper has a casing and a shaft axially movable relative to the casing. The shaft and the casing are respectively attached to the body and to a suspension arm belonging to the suspension. The suspension arm, in turn, is normally coupled to one of the wheels.

Inside the casing, the shaft carries a piston cooperating fluid dynamically with a fluid contained in the casing itself, thus damping the relative movements between the shaft and the casing.

The suspension arm follows the movement of the wheel to which it is coupled. Therefore, the wheel movements due to road contact are transmitted to the suspension arm resulting in relative movement between the shaft and the casing, which is dampened by fluid-dynamic cooperation between the piston and the fluid contained in the casing.

A suspension is said to be active if it additionally includes a force-generating system to actively control the movement of the body relative to the arm, that is, of the shaft relative to the casing.

The system can be of various types; for example, some systems control the damping offered by the damper by regulating the fluid-dynamic cooperation between the piston and fluid.

Other systems directly impose a controlled movement on the body, relative to the wheels, by means of servo actuators, for example electric, hydraulic, pneumatic, or electro-hydraulic ones.

Generally, in the field of motor vehicles, whether they have active suspensions or not, there is a constant need to improve their performance.

More specifically, there is a need to improve the performance of motor vehicles, for example in an acceleration phase starting from a steady state.

One purpose of the invention is to meet at least one of the above needs, preferably in a simple way that can be repeated.

DESCRIPTION OF THE INVENTION

The purpose is achieved by means of a motor vehicle as defined in claim 1.

The dependent claims define particular embodiments of the invention.

BRIEF DESCRIPTION OF THE DRAWINGS

To better understand the invention, one embodiment thereof is described hereinafter by way of non-limiting example and with reference to the accompanying drawings, wherein.

EMBODIMENTS OF THE INVENTION

Figure 1:
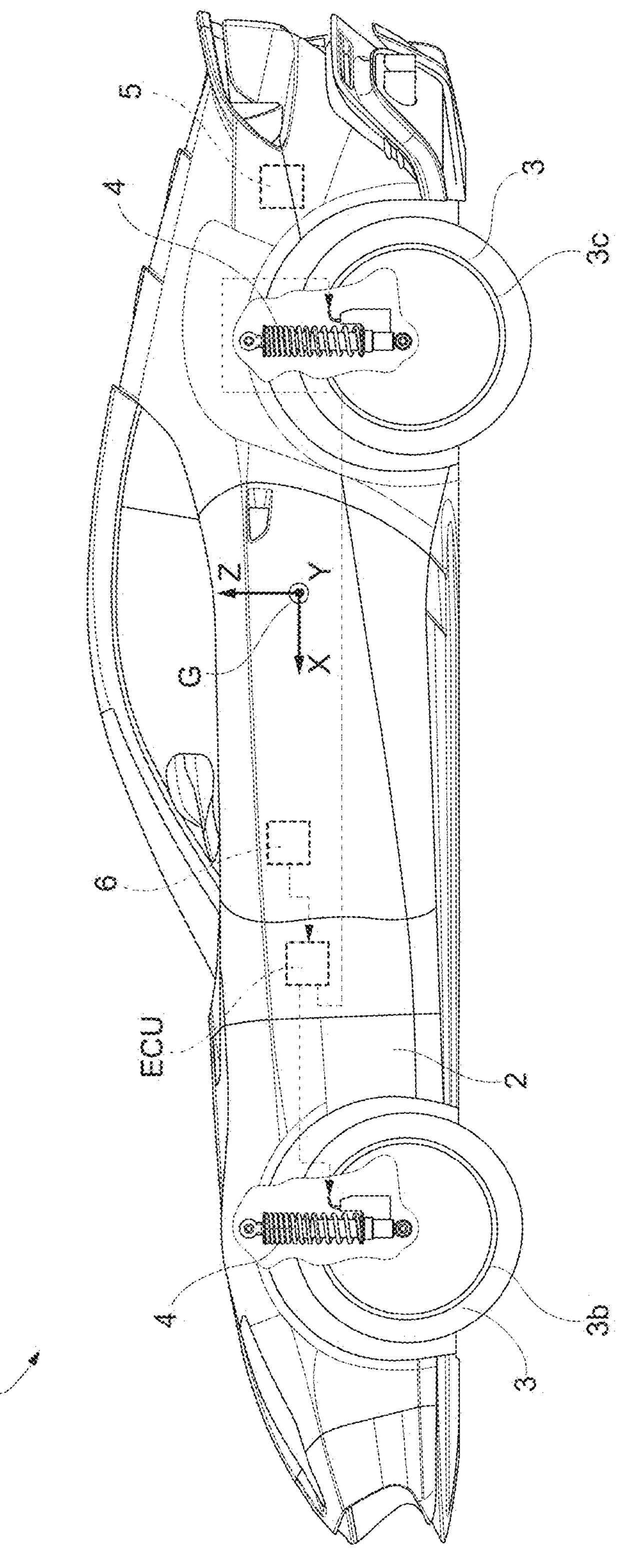
FIG. 1 is a side view of a motor vehicle according to the invention with a schematic representation of an active suspension.

In FIG. 1, the reference number 1 is used to indicate, as a whole, a motor vehicle.

Like all motor vehicles, the motor vehicle 1 has a body 2, that is, a structural assembly including a frame and a bodywork.

The body 2 defines or surrounds the passenger compartment of the motor vehicle 1.

In addition, the motor vehicle 1 comprises multiple wheels 3, of which a first pair defines front wheels **3*b* and a second pair defines rear wheels 3*c***.

FIG. 1 shows only one of the front wheels **3*b* and one of the rear wheels 3*c*; both the front wheels 3*b* and rear wheels 3*c* are aligned with each other according to their respective axes that are essentially parallel to a pitch axis Y of the motor vehicle 1**.

The pitch axis Y is one of the three axes defining a reference system, which is integral with the body 2 and also consists of a roll axis X and a yaw axis Z orthogonal to each other and also orthogonal to the pitch axis Y.

With reference to the conditions of use of the motor vehicle 1, the pitch axis Y is horizontal, while the yaw axis Z has at least one vertical component, that is, oriented along a direction of a weight or weight force of the motor vehicle 1, that is along a direction of the acceleration of gravity. The roll axis X is parallel to a direction along which the motor vehicle 1 extends longitudinally, so in a longitudinal direction or forward direction of the motor vehicle 1.

The reference system consisting of the axes X, Y, Z can be applied to a centre of mass G of the motor vehicle 1. For the sake of clarity, terms such as front, rear, in front of, behind, and the like refer to the centre of mass G in this description and, more specifically, also to the forward direction or the direction of acceleration of the motor vehicle 1.

The wheels **3*b*, 3*c* are respectively part of a front and rear axle of the motor vehicle 1**.

The motor vehicle 1 comprises at least one engine 5 supported by the body 2 and at least one transmission (not illustrated) connecting or configured to connect the engine 5 to the wheels **3*b* and/or 3*c*, which therefore define traction wheels when connected to the engine 5**.

Through the transmission, the engine 5 can deliver torque to the traction wheels, thus causing the motor vehicle 1 to accelerate.

The motor vehicle 1 also comprises a suspension or suspension assembly 4, via which the wheels **3*b*, 3*c* are coupled to the body 2**.

The wheels **3*b*, 3*c* are part of an unsprung mass of the motor vehicle 1, so that they are arranged in direct contact with the road; therefore, as the motor vehicle 1 moves forward, the wheels 3***b*, 3*c* move according to the axis Z as a function of the features of the road with which they are in contact.

The movements of the wheels 3*b*, 3*c* are transmitted to the suspension 4 elements.

The body 2 is part of a suspended mass of the motor vehicle 1. The suspension 4 is configured to suspend the suspended mass relative to the unsprung mass.

Thanks to the suspension 4, the body 2 can have a relative movement with respect to the wheels 3*b*, 3*c* according to the axis Z, while being coupled to them via the same suspension 4.

The suspension 4 is an active suspension, so it can be controlled to exert an actuating force to amplify or reduce the aforementioned relative movement, that is, the displacement of the wheels 3*b*, 3*c* relative to the body 2, or even to generate or impose the displacement of the wheel 3 relative to the body 2.

In other words, the suspension 4 can be controlled to move the suspended mass relative to the unsprung mass, particularly along the axis Z.

The suspension 4 comprises, in particular, at least one actuator configured to provide a power output and a conversion assembly configured to convert the power provided by the actuator into a force adapted to displace the suspended mass relative to the unsprung mass.

For example, the suspension 4 could comprise four actuators respectively arranged between the wheels 3*b*, 3*c* and the body 2 and configured to move the body relative to the wheels 3*b*, 3*c*, in particular according to the axis Z.

In general, alternatives of suitable active suspension devices that could be part of the suspension 4 to move the suspended mass relative to the unsprung mass are known and, therefore, not described in further detail.

The motor vehicle 1 comprises a control unit ECU configured to control the suspension 4 during an acceleration, specifically a longitudinal one (more specifically, exclusively a longitudinal one), and/or a steady state (e.g. immediately prior to acceleration) of the motor vehicle 1 by imposing a displacement of the suspended mass relative to the unsprung mass according to the axis Z.

The control unit ECU controls the suspension 4 to increase or, more precisely, to maximise a maximum force transmissible from the traction wheels to the road.

Clearly, the force actually transmitted from the traction wheels to the road will depend on the torque delivered by the engine 5, as well as the characteristics of the transmission connecting the engine 5 to the traction wheels.

On the other hand, the torque delivered by the engine 5 and the characteristics of the transmission are independent of the displacement imposed by the control unit ECU via the suspension 4.

In other words, the displacement imposed by the control unit ECU is independent of the torque delivered by the engine 5 or the value of acceleration and transmission characteristics.

Accordingly, the control unit ECU maximises or increases the maximum transmissible force, irrespective or independently of the torque delivered by the engine 5 and the transmission characteristics, in particular provided that constraints imposed on said displacement by the operating conditions of the motor vehicle 1 (the operating conditions may, for example, include accelerations, such as longitudinal acceleration, and/or speeds of the motor vehicle 1), for example constraints on a maximum or minimum height that the centre of mass G of the motor vehicle 1 can reach, are observed.

More specifically, the control unit ECU maximises or increases the component along the axis X of the maximum transmissible force.

The component along the axis X of the maximum transmissible force is proportional to the resultant of the forces along the axis Z (vertical force) and a friction coefficient.

In turn, the resultant or force along the axis Z is the algebraic sum of a static contribution and a dynamic contribution.

The dynamic contribution, also known as the load transfer contribution, is, specifically, the product of the mass of the motor vehicle 1, the longitudinal acceleration (along the axis X) of the motor vehicle 1, and the height of the centre of mass G along the axis Z, divided by the distance along the axis X between the wheels 3*b*, 3*c*.

From here, it can be seen that a change in the height of the centre of mass G leads to a change in the dynamic contribution and, thus, in the maximum transmissible force (both in the component along the axis X and in the component along the axis Z).

Thus, the control unit ECU varies the height of the centre of mass G through the displacement of the suspended mass relative to the unsprung mass along the axis Z.

Figure 2:
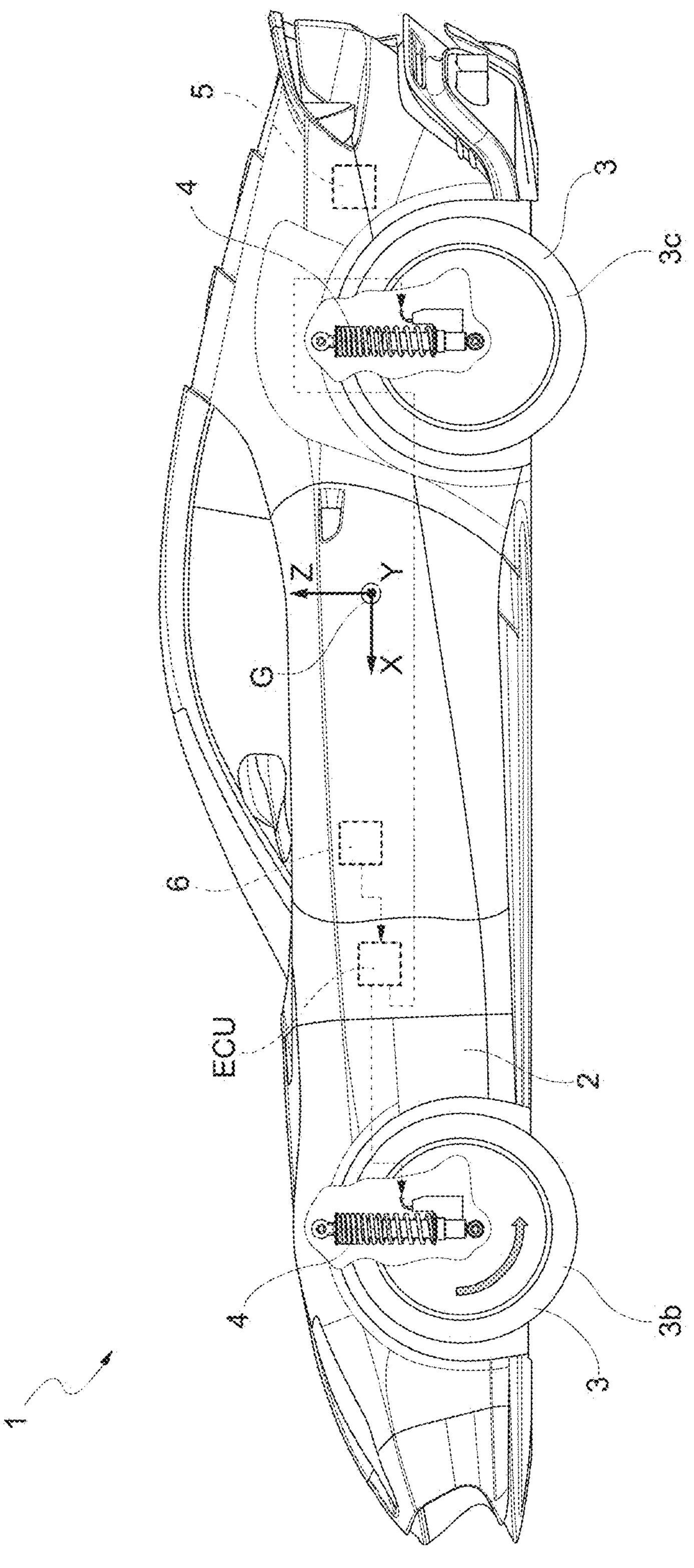
FIGS. 2-3 are similar to FIG. 1 and represent the motor vehicle in respective, distinct operating conditions.

Assuming that the traction wheels are the wheels 3*b*, the dynamic contribution is subtracted from the static contribution (the dynamic contribution is negative), so the control unit ECU increases or maximises the maximum transmissible force by lowering the suspended mass relative to the unsprung mass, that is, by decreasing the height of the centre of mass G (FIG. 2).

Here, the displacement imposed by the control unit ECU is, therefore, a lowering of the suspended mass relative to the unsprung mass.

The control unit ECU is preferably configured to determine a minimum limit for the height of the centre of mass G based on the operating conditions of the motor vehicle 1, including or comprising the speed of the motor vehicle 1. Thus, when the traction wheels are the wheels 3*b*, the control unit ECU imposes the lowering of the suspended mass relative to the unsprung mass by bringing or up to bringing the height of the centre of mass G to coincide with the minimum limit calculated.

Figure 3:
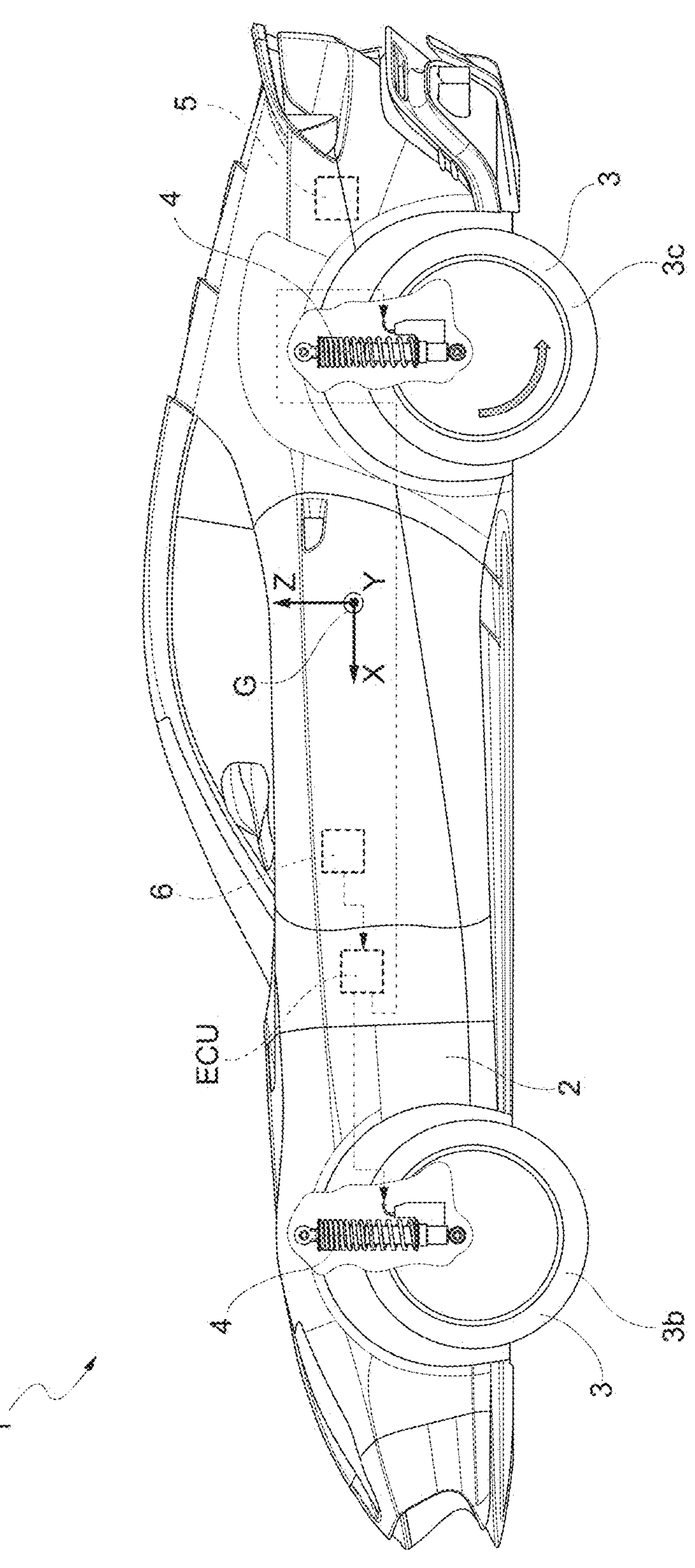

Assuming that the traction wheels are the wheels 3*c*, the dynamic contribution here increases the static contribution (the dynamic contribution is positive), so the control unit ECU increases or maximises the maximum transmissible force by lifting the suspended mass relative to the unsprung mass, that is by increasing the height of the centre of mass G (FIG. 3).

Here, the displacement imposed by the control unit ECU is, therefore, a lifting of the suspended mass relative to the unsprung mass.

The control unit ECU is preferably configured to determine a maximum limit for the height of the centre of mass G based on the operating conditions of the motor vehicle 1, including or comprising the speed of the motor vehicle 1. Thus, when the traction wheels are the wheels 3*c*, the control unit ECU imposes the lifting of the suspended mass relative to the unsprung mass by bringing or up to bringing the height of the centre of mass G to coincide with the maximum limit calculated.

More generally, for example if all the wheels 3*b*, 3*c* define traction wheels, the control unit ECU could be configured to solve an optimisation problem, in which the control unit ECU calculates an optimal height for the centre of mass G that overall maximises the maximum transmissible force (for example, from the wheels 3*b*, 3*c*) to the road.

Thus, the control unit ECU imposes the displacement of the suspended mass relative to the unsprung mass by bringing or up to bringing the height of the centre of mass G to coincide with the optimal height calculated.

The optimisation problem could be constrained; in other words, the control unit ECU would calculate the optimal height by respecting one or more constraints depending on the operating conditions of the motor vehicle 1, including either longitudinal acceleration and/or the speed of the motor vehicle 1.

To solve the optimisation problem, whether constrained or unconstrained, the control unit ECU could perform any of the mathematical methods (for example an operational search method) that is known for solving optimisation problems. Therefore, the following description will not go into the details of these mathematical methods.

Solving the optimisation problem involves, in particular, determining the height of the centre of mass G that maximises the argument of a function that is positively correlated or increasing with the maximum transmissible force as a function of the height of the centre of mass, or that minimises the argument of a function that is negatively correlated or decreasing with the maximum transmissible force as a function of the height of the centre of mass. The increasing function could be, for example, the maximum transmissible force, just as the decreasing function could be, for example, the reciprocal of the maximum transmissible force.

Solving an optimisation problem is not in itself strictly necessary in general; in fact, the increase of the maximum transmissible force can be obtained in many ways, for example also by choosing a change in the height of the centre of mass G, where the chosen change is experimentally adapted to the specific motor vehicle 1 and/or to a particular, predetermined manoeuvre of it (for example, an acceleration from the steady state to a predetermined speed) to achieve an increase or maximisation of the maximum transmissible force, for example consistent with the displacement or height of the centre of mass G constraints dictated by the operating conditions of the motor vehicle 1 (including speed).

Clearly, the chosen change will correspond to a displacement of the suspended mass that can be imposed by the control unit ECU with respect to the unsprung mass.

The control unit ECU is preferably configured to impose the displacement of the suspended mass relative to the unsprung mass when the acceleration, specifically a longitudinal one (more specifically, an exclusively longitudinal one), of the motor vehicle 1 starts with the motor vehicle 1 in the steady state.

In other words, the control unit ECU imposes the displacement in response to the fact that a sensing device detects non-zero acceleration, particularly specifically a longitudinal one, more specifically, an exclusively longitudinal one.

The control unit ECU is configured to identify the event of acceleration, for example by acquiring relevant information from sensors of the motor vehicle 1 configured to detect acceleration, or because the control unit ECU itself is configured to control acceleration, for example based on a signal indicating a request for acceleration by a driver of the motor vehicle 1.

The control unit ECU could comprise one or more separate processors or control units, possibly but not necessarily connected to each other.

The control unit ECU could impose the displacement of the suspended mass when it determines that the acceleration of the motor vehicle 1 starts from the steady state.

For the sake of clarity, the steady state is understood as a state in which the motor vehicle 1 is stationary or moving forward at a constant speed. In some embodiments, the steady state could be limited or replaced by a stationary state, in which the speed of the motor vehicle 1 is zero, or a state of constant speed, in which the speed of the motor vehicle 1 is constant.

Alternatively or in addition, the control unit ECU is configured to impose the displacement of the suspended mass also or only during the steady state preceding acceleration, that is, specifically immediately or immediately before acceleration, specifically longitudinal acceleration (more specifically, an exclusively longitudinal acceleration).

Here, in particular, the control unit ECU could be configured to determine (during the steady state) in advance that acceleration will occur, that is, to predict the event of acceleration during the steady state. For example, the control unit ECU predicts the event of acceleration when it receives a signal indicating a request for acceleration from a driver of the motor vehicle 1.

Thus, the control unit ECU imposes the displacement of the suspended mass during the steady state in response to the prediction of the event of acceleration or when it predicts the event of acceleration, that is, in response to the reception of a signal indicating a request for acceleration.

The motor vehicle 1 preferably comprises a request control 6, for example inside the passenger compartment, which the driver can operate to emit the signal indicating an acceleration request. The control unit ECU is coupled to the request control 6 to receive the signal emitted by the request control 6.

The request control 6 could be a typical accelerator pedal of the motor vehicle 1.

More preferably, the request control 6 is a separate control from the accelerator pedal and/or is a specific control for requesting a specific acceleration, that is, an acceleration manoeuvre, for example from the steady state up to a predetermined speed of the motor vehicle 1, for example 100 km/h. The separate control could be a lever, for example, or another suitable component, such as a button, a knob, or the like.

Figure 4:
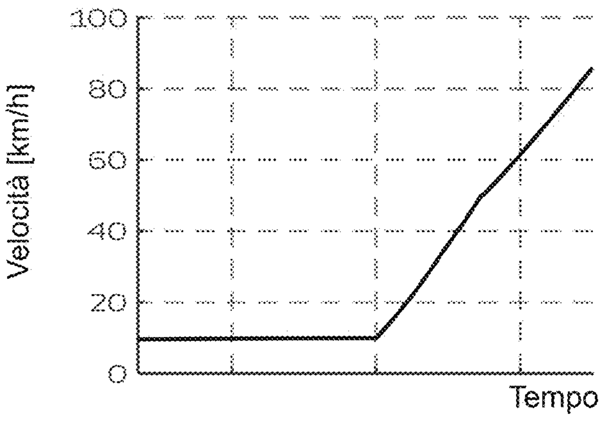
FIGS. 4-6 are graphs depicting the trend of operational quantities of the motor vehicle over time during its use.
Figure 5:
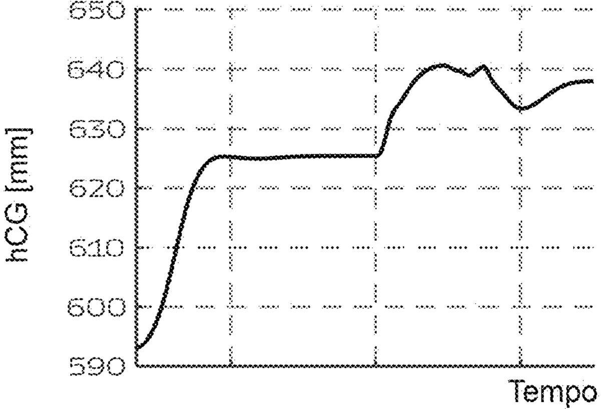
Figure 6:
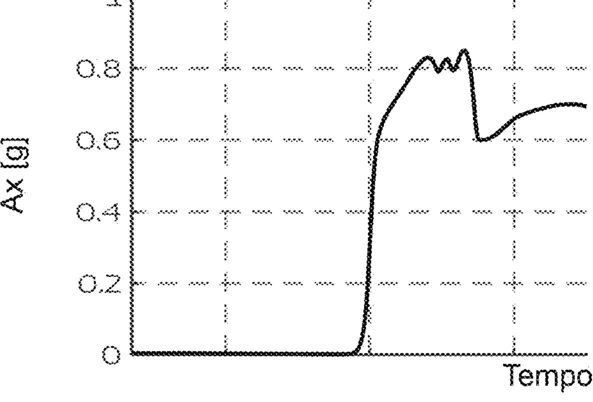

FIGS. 4-6 illustrate the operation of the motor vehicle 1 when the control unit ECU receives the signal emitted by the request control 6. Here, the traction wheels are defined by the wheels 3*c*, so the height of the centre of mass G will increase to increase the force transmissible from the wheels 3*c* to the road.

The x-axis is common to all of FIGS. 4-6 and represents time.

The y-axis in FIGS. 4-6 represents the speed of the motor vehicle 1, the height of the centre of mass G (hCG), and the longitudinal acceleration (Ax) of the motor vehicle 1, respectively.

As can be seen from FIGS. 4-6, in the steady state (here specifically with non-zero, constant speed), starting with the reception of the signal emitted by the request control 6, the control unit ECU imposes the lifting of the suspended mass, that is, the increase of the height of the centre of mass G.

Specifically, the increase comprises a first increase in height at a first-time interval and maintenance of the (constant) height at a subsequent, second time interval, immediately prior to acceleration, here, specifically a longitudinal one, more specifically, an exclusively longitudinal one.

Starting from the acceleration (here, specifically, a longitudinal one, more specifically, an exclusively longitudinal one) or from the moment the acceleration (here, specifically, a longitudinal one, I specifically, an exclusively longitudinal one) starts with the motor vehicle 1 in the steady state, the control unit ECU continues to impose the displacement of the suspended mass, that is the change in the height of the centre of mass G. Here, specifically, the lifting of the suspended mass or the height continues during acceleration. The control unit ECU carries out a method for controlling the motor vehicle 1. The method comprises the step of imposing displacement of the suspended mass relative to the unsprung mass via the suspension 4 along the axis Z during acceleration (specifically a longitudinal one, more specifically, an exclusively longitudinal one) and/or in a steady state of the motor vehicle to increase the maximum force 1 transmissible from the traction wheels to the road.

For example, the displacement can be imposed at the moment when acceleration (specifically a longitudinal one, more specifically, an exclusively longitudinal one) starts with the motor vehicle in the steady state. Alternatively or in addition, the event of acceleration can be predicted during the steady state; here, the displacement of the suspended mass is imposed during the steady state when the event of acceleration is predicted.

In particular, the displacement is a lowering of the suspended mass relative to the unsprung mass when the traction wheels are arranged in front of the centre of mass G according to an acceleration direction.

In addition, in particular, the displacement is a lifting of the suspended mass relative to the unsprung mass when the traction wheels are arranged behind the centre of mass G according to an acceleration direction. In general, any step or action performed by the control unit ECU can be part of the method.

From the above, the advantages of the motor vehicle 1 and the method according to the invention are clear.

By appropriately changing the height of the centre of mass G, the maximum transmissible force to the road can be increased with a clear increase in the performance of the motor vehicle 1 during its acceleration, more specifically through increased adhesion to the road.

Finally, it is clear that changes may be made to the motor vehicle and the method according to the invention, and variations produced thereto, that, in any case, do not depart from the scope of protection defined by the claims.

The invention claimed is:

1. A motor vehicle, comprising:

a suspended mass comprising a body;

an unsprung mass comprising a plurality of wheels to allow the motor vehicle to move forward on the road;

an active suspension assembly configured to suspend the suspended mass relative to the unsprung mass and controllable to move the suspended mass relative to the unsprung mass;

an engine carried by the body;

a transmission connecting the engine to at least two of said wheels, thereby defining traction wheels, such that the engine can deliver torque to the traction wheels causing acceleration of the motor vehicle; and a control unit configured to control the active suspension assembly during said acceleration and/or in a steady state of the motor vehicle preceding said acceleration by imposing a displacement of the suspended mass relative to the unsprung mass according to a yaw axis of the motor vehicle to increase a maximum transmissible force from the traction wheels to the road.

2. The motor vehicle according to claim 1, wherein the control unit is configured to impose said displacement at the time when said acceleration starts with the motor vehicle in the steady state.

3. The motor vehicle according to claim 1, wherein the control unit is configured to predict an occurrence of said acceleration during the steady state via reception of a signal indicating a request for acceleration, wherein the control unit is further configured to impose said displacement during the steady state when predicting the occurence of said acceleration.

4. The motor vehicle according to claim 1, wherein the traction wheels are arranged in front of a centre of mass of the motor vehicle according to a direction of said acceleration, and wherein the displacement imposed by the control unit is a lowering of the suspended mass relative to the unsprung mass.

5. The motor vehicle according to claim 4, wherein the control unit is configured to calculate a minimum limit for the height of the centre of mass, relative to a reference point, based on operating conditions of the motor vehicle comprising the speed of the motor vehicle, wherein the lowering imposed by the control unit brings the height of the centre of mass, relative to the reference point, to coincide with the minimum limit.

6. The motor vehicle according to claim 1, wherein the traction wheels are arranged behind a centre of mass of the motor vehicle according to a direction of said acceleration, and wherein the displacement imposed by the control unit is a lifting of the suspended mass relative to the unsprung mass.

7. The motor vehicle according to claim 6, wherein the control unit is configured to calculate a maximum limit for a height of the centre of mass, relative to a reference point, based on operating conditions of the motor vehicle comprising the speed of the motor vehicle, wherein the lifting imposed by the control unit brings the height of the centre of mass, relative to the reference point, to coincide with the maximum limit.

8. The motor vehicle according to claim 1, wherein the control unit is configured to resolve a problem of optimisation calculating an optimal height of a centre of mass of the motor vehicle, relative to a reference point, that maximises said maximum transmissible force, wherein the displacement imposed by the control unit brings the height of the centre of mass, relative to the reference point, to coincide with the optimal height calculated.

9. The motor vehicle according to claim 1, wherein the body comprises a front, a rear, and a longitudinal axis extending between the front and the rear, and wherein said acceleration is a longitudinal acceleration along the longitudinal axis.

10. A method for controlling a motor vehicle comprising a suspended mass comprising a body, an unsprung mass comprising a plurality of wheels to allow the motor vehicle to move forward on a road, an active suspension assembly configured to suspend the suspended mass relative to the unsprung mass and controllable to move the suspended mass relative to the unsprung mass, an engine carried by the body, and a transmission connecting the engine to at least two of said wheels, thereby defining traction wheels, such that the engine can deliver torque to the traction wheels causing acceleration of the motor vehicle, the method comprising the step of imposing during said acceleration and/or in a stationary state of the motor vehicle prior to said acceleration a displacement of the suspended mass relative to the unsprung mass via the active suspension assembly according to a yaw axis of the motor vehicle to increase the maximum transmissible force from the traction wheels to the road.

11. The method according to claim 10, wherein the displacement is imposed at the time when said acceleration starts with the motor vehicle in a steady state.

12. The method according to claim 10, further comprising the steps of predicting the event of acceleration during the steady state and imposing said displacement during the steady state when the event of acceleration is predicted.

13. The method according to claim 10, wherein the displacement is a lowering of the suspended mass relative to the unsprung mass when the traction wheels are arranged in front of a centre of mass of the motor vehicle according to a direction of said acceleration.

14. The method according to claim 13, wherein the lowering brings the height of the centre of mass to coincide with a related minimum limit calculated based on operating conditions of the motor vehicle comprising the speed of the motor vehicle.

15. The method according to claim 10, wherein the displacement is a lifting of the suspended mass relative to the unsprung mass when the traction wheels are arranged behind a centre of mass of the motor vehicle according to a direction of said acceleration.

16. The method according to claim 15, wherein the lifting brings the height of the centre of mass to coincide with a related maximum limit calculated based on operating conditions of the motor vehicle comprising the speed of the motor vehicle.

17. The method according to claim 10, wherein the displacement brings the height of a centre of mass of the motor vehicle to coincide with a relative optimal height calculated by solving an optimisation problem, wherein solving the optimisation problem is the calculation of the optimal height that maximises said maximum transmissible force.

18. The method according to claim 10, wherein the body comprises a front, a rear, and a longitudinal axis extending between the front and the rear, and wherein said acceleration is a longitudinal acceleration along the longitudinal axis.

19. A motor vehicle, comprising:

a suspended mass comprising a body;

an unsprung mass comprising a plurality of wheels to allow the motor vehicle to move forward on the road;

an active suspension assembly configured to suspend the suspended mass relative to the unsprung mass and controllable to move the suspended mass relative to the unsprung mass;

an engine carried by the body;

a transmission connecting the engine to at least two of said wheels, thereby defining traction wheels, such that the engine can deliver torque to the traction wheels causing forward acceleration of the motor vehicle; and a control system configured to control the active suspension assembly in response to an input to create said forward acceleration by imposing a displacement of the suspended mass relative to the unsprung mass according to a yaw axis of the motor vehicle to increase a maximum transmissible force from the traction wheels to the road.

* * * * *